US011878319B2

(12) United States Patent
Yeiser

(10) Patent No.: US 11,878,319 B2
(45) Date of Patent: Jan. 23, 2024

(54) FOUNTAIN TOWER

(71) Applicant: John Yeiser, Santee, CA (US)

(72) Inventor: John Yeiser, Santee, CA (US)

(*) Notice: Subject to any disclaimer, the term of this patent is extended or adjusted under 35 U.S.C. 154(b) by 0 days.

(21) Appl. No.: 15/867,804

(22) Filed: Jan. 11, 2018

(65) Prior Publication Data

US 2019/0210056 A1 Jul. 11, 2019

(51) Int. Cl.
*B05B 17/08* (2006.01)

(52) U.S. Cl.
CPC .................................... *B05B 17/08* (2013.01)

(58) Field of Classification Search
CPC ..... B05B 17/08; B05B 17/085; B05B 9/0416; B05B 12/02; B05B 12/04; B05B 12/06
USPC ............................................................ 239/17
See application file for complete search history.

(56) References Cited

U.S. PATENT DOCUMENTS 2,510,446 A * 6/1950 Weil ........................ B05B 17/08 239/23
6,439,471 B2 * 8/2002 Ehrlich ................... F21V 35/00 239/289
6,755,349 B2 * 6/2004 Beidokhti ............... B05B 17/08 239/16
8,210,447 B2 * 7/2012 Cohen ..................... B05B 17/08 239/20
9,492,834 B1 * 11/2016 Bishel ..................... B05B 17/08
2011/0240757 A1 * 10/2011 Selk ........................ B05B 17/08 239/18
2016/0052009 A1 * 2/2016 Hoeks ..................... B05B 17/08 239/1

FOREIGN PATENT DOCUMENTS

DE 202017107853 * 1/2018 ............. B05B 17/08
GB 2128269 * 4/1984 ............. B05B 17/08

OTHER PUBLICATIONS

Lana, Bernini Dancing Rechargeable Fountain, Apr. 19, 2016, available at https://www.bargainhuntingmoms.com/2016/04/-bernini-dancing-waters-rechargeable-fountain-on-easy-pay.html (Year: 2016).*
Lana, Bernini Dancing Rechargeable Fountain, Apr. 19, 2016, available at https:/Avww.bargainhuntingmoms.com/2016/04/-bernini-dancing-waters-rechargeable-fountain-on-easy-pay.html (Year: 2016).*

* cited by examiner

*Primary Examiner* — Christopher R Dandridge
(74) *Attorney, Agent, or Firm* — Bay State IP, LLC

(57) ABSTRACT

A portable fluid dispersion, or fountain system includes a removably attached, internally disposed pump system. The system is designed to rest on a flat surface of a bowl or basin that is filled with water and provide an instant dancing water fountain. The portable fluid dispersion, or fountain system includes a fluid drainage and recirculation system. The system includes a timer mechanism that automatically actuates and shuts down the system in intervals defined by seconds, minutes, hours and days.

26 Claims, 19 Drawing Sheets

FOUNTAIN TOWER

BACKGROUND OF THE INVENTION

Field of the Invention

The present system pertains to a water ejection system and more particularly to a system and apparatuses for a fountain apparatus that is portable and transferable and which can be used with any basin that holds water.

Description of the Related Art

A fountain is a piece of architecture in which water flows or is projected into the air and then cycles into a basin. It can be used to supply drinking water or for decoration.

Originally fountains were purely functional. They were connected to springs or aqueducts and used to provide drinking water and water for bathing and washing to the residents of cities, towns and villages. Early fountains operated by gravity, needing a source of water higher than the fountain to make the water flow or project into the air.

Fountains were also used for decoration. Some were decorated with bronze or stone masks of animals or heroes while others were used to illustrate power over nature. By the end of the 19th century, urban fountains became purely decorative due to the rise in popularity of indoor plumbing. Mechanical pumps began to replace gravity.

Today, fountains are used as decoration of city parks and squares, to honor individuals or events, for recreation and for entertainment. Things like splash pads and spray pools are used to cool off on a hot summer day while musical fountains combine lights and music with the rhythm of the spray of the water. Drinking fountains now provide clean drinking water in public buildings, parks and public spaces.

SUMMARY OF THE INVENTION

The instant system, series of apparatuses and method of usage, as illustrated herein, are clearly not anticipated, rendered obvious, or even present in any of the prior art mechanisms, either alone or in any combination thereof. Thus the several embodiments of the instant apparatus are illustrated herein.

In one embodiment, the instant system contemplates a novel fountain tower apparatus.

In one embodiment, the instant system contemplates a novel fountain tower apparatus including a fountain structure and pump.

It is an objective of the instant system to further disclose a novel fountain tower apparatus with a multi-hole output tube body.

The instant system discloses a novel fountain tower apparatus with a pump system that is powered by batteries.

Additionally, it is an object of the instant system to disclose a bird feeder apparatus with a multi-purpose power and timer switch which allows for the fountain to remain on for a designated amount time, after which it automatically turns off. This cycle repeats automatically until the switch is turned to the "off" position.

The instant system further discloses a novel fountain tower apparatus which can rest in a suitable water containment system, even a convenient bowl of water with a flat surface bottom.

The instant system further discloses a novel fountain tower apparatus that is removable, portable and transferable from one water source to another, and does not require a bottom bowl or a top bowl.

The instant system also discloses a novel fountain tower apparatus that is easy to use, easy to install, light weight, inexpensive, and efficient and can be utilized with numerous available sources of fluid.

Moreover, it is additionally an objective of the present system to defy convention in that concurrent fountains require a reservoir, but herein, the mobility of construction and design allow the user to place the system into body of water and instantly possess a fountain system.

Furthermore, it is an objective of the present system to introduce a cordless pump, so that a pump, a water drop tower, a power source and control mechanism can be dropped into any container and it makes an instant fountain. And, it is an additional objective of the system to eradicate the need for a cord for the power source, external button controls to turn on and off, or provide a water drop attached to the pump, or any combinations required for installation.

Moreover, it is an objective of the instant water drop system, to feature a portable system, does not include a water source, wherein the water tube is disposed to travel substantially through the center of the cosmetic outer structure.

Finally, the instant fountain discloses a modular apparatus wherein the outer structure is interchangeable due to the water drop configuration of the pumping system, including a flange designed to self-seat upon installation, without the need for adjustment, or any fixtures, screwing or fastening mechanism to hold the pump the pump assembly. Thus, the self-seating retaining flange construction allows for interchangeable cosmetically and aesthetically pleasing versions may be utilized instantly.

There has thus been outlined, rather broadly, the more important features of the fountain tower apparatus in order that the detailed description thereof that follows may be better understood, and in order that the present contribution to the art may be better appreciated. There are additional features of the system that will be described hereinafter and which will form the subject matter of the claims appended hereto.

In this respect, before explaining at least one embodiment of the system in detail, it is to be understood that the system is not limited in its application to the details of construction and to the arrangements of the components set forth in the following description or illustrated in the drawings. The system is capable of other embodiments and of being practiced and carried out in various ways. Also, it is to be understood that the phraseology and terminology employed herein are for the purpose of description and should not be regarded as limiting.

These together with other objects of the system, along with the various features of novelty, which characterize the system, are pointed out with particularity in the claims annexed to and forming a part of this disclosure. For a better understanding of the system, its operating advantages and the specific objects attained by its uses, reference should be made to the accompanying drawings and descriptive matter in which there are illustrated preferred embodiments of the system.

The foregoing has outlined the more pertinent and important features of the present system in order that the detailed description of the system that follows may be better understood, and the present contributions to the art may be more fully appreciated. It is of course not possible to describe every conceivable combination of components and/or methodologies, but one of ordinary skill in the art may recognize that many further combinations or permutations are possible. Accordingly, the novel architecture described below is intended to embrace all such alterations, modifications, and variations that fall within the spirit and scope of the appended claims.

BRIEF DESCRIPTION OF THE DRAWINGS

Advantages of the present system will be apparent from the following detailed description of exemplary embodiments thereof, which description should be considered in conjunction with the accompanying drawings, in which having thus described the system in general terms, reference will now be made to the accompanying drawings, which are not necessarily drawn to scale, and wherein.

DETAILED DESCRIPTION OF THE SEVERAL EMBODIMENTS

The detailed description set forth below in connection with the appended drawings is intended as a description of presently preferred embodiments of the system and does not represent the only forms in which the present system may be constructed and/or utilized. The description sets forth the functions and the sequence of steps for constructing and operating the system in connection with the illustrated embodiments.

Figure 1:
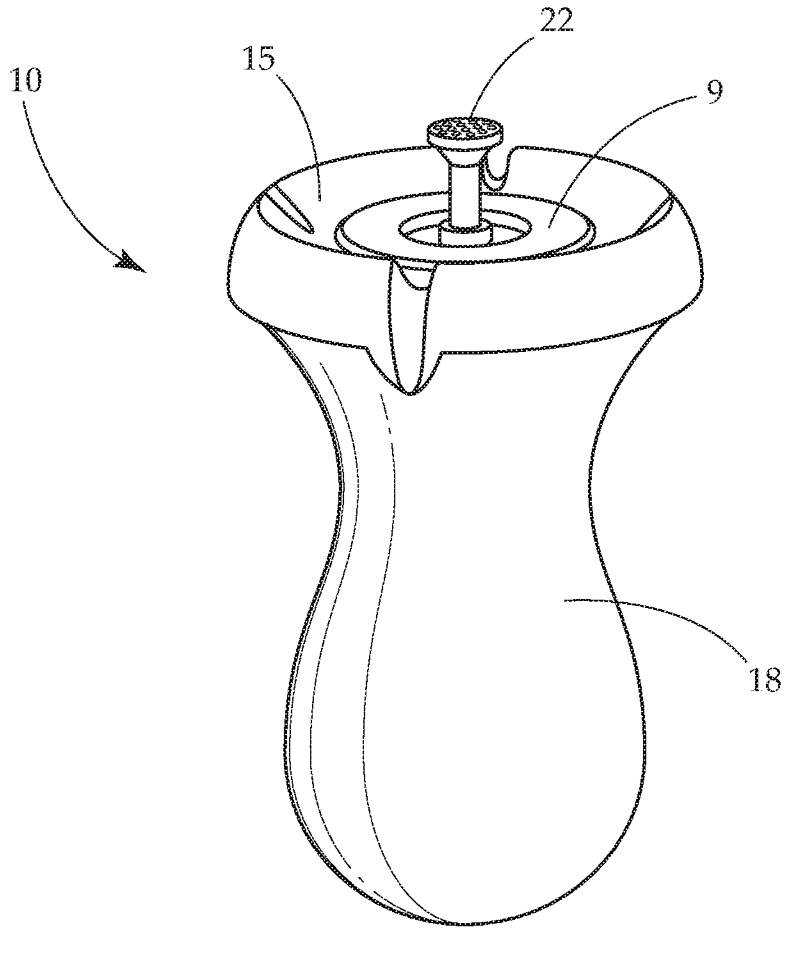
FIG. 1 illustrates a perspective front view of one embodiment of the assembled fountain tower system.

FIG. 1 illustrates a perspective front view of a fully assembled version of one embodiment of the instant system (Insta Fountain™) 10. The fountain main body structure 18 supports the flange 9 of the pump system 11 (Shown in detail in FIGS. 3*a-c* and 5) which may be removable, in the center of the top.

Figure 2:
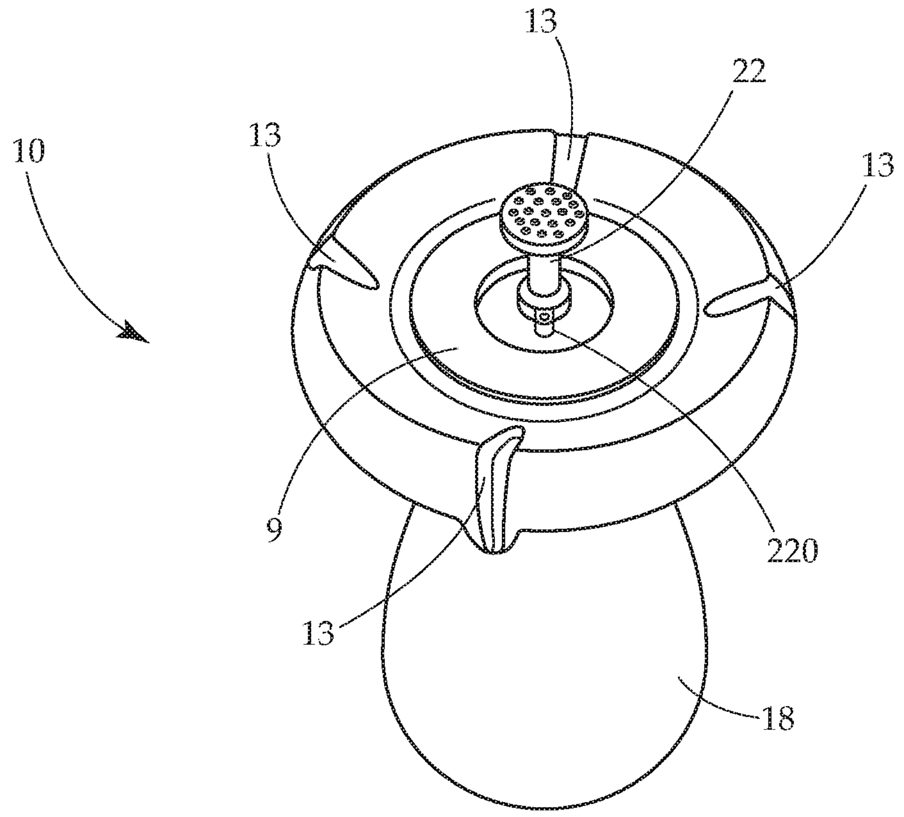
FIG. 2 illustrates a top-front perspective view of one embodiment of the assembled fountain tower system.

FIG. 2 illustrates a top-front perspective view of one embodiment of the assembled Insta Fountain™ system 10, additionally illustrating at least one fluid drainage port 13. In this embodiment, four fluid drainage ports 13 are illustrated and utilized in order to provide quick and even drainage. The fluid drainage ports 13 afford recirculation of the fluid upon accumulation of the fluid in the water containment vessel 15.

Figure 3A:
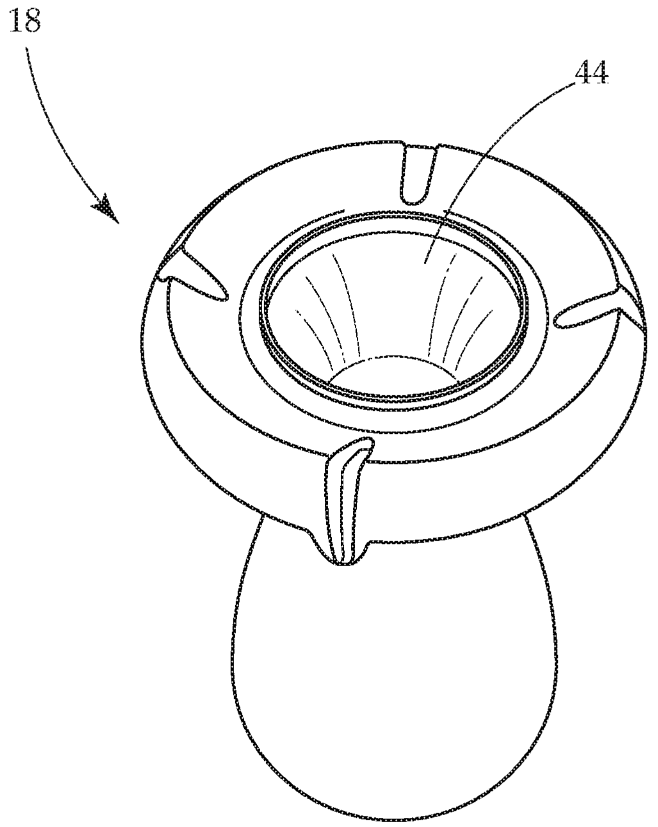
FIG. 3A-I illustrates a dissected view of one embodiment of the fountain tower system.

As seen in FIGS. 3A-3I, embodiments of the overall the battery/water pump assembly 11 may include a unitary piece, which is wholly removable in order to enhance cleaning and transportability of one embodiment of the instant system (Insta Fountain™) 10. FIG. 3A illustrates a top perspective view of one embodiment of the Insta Fountain™ system 10 in a disassembled form, with the pump system assembly removed.

Figure 3B:
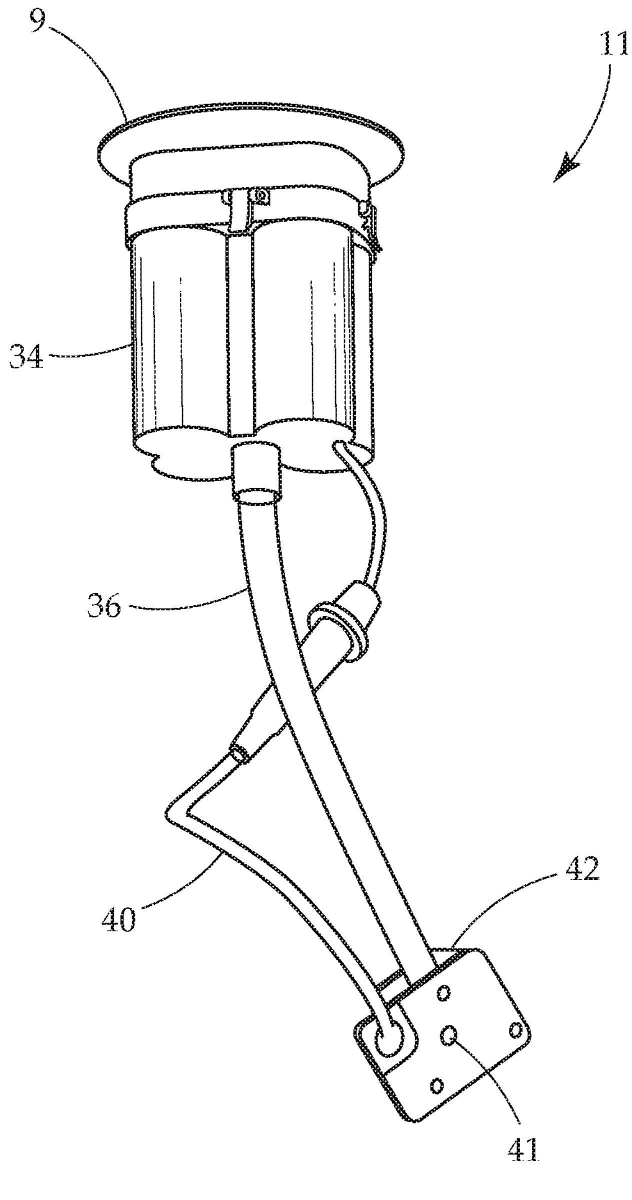

FIG. 3B illustrates one embodiment of the pump system assembly 11, illustrating a water pump tube 36, a battery compartment 34, a water pump 42, and a nozzle 22. The battery compartment 34 is in communication with the water pump 42 by way of the water pump power cord 40. The water pump interface plate is removed to illustrate the water pump suction intake 41 in communication with the water pump tube 36 which completes the flow through communication with the battery compartment 34 which houses the power unit for this embodiment of the instant system (Insta Fountain™) 10.

Figure 3C:
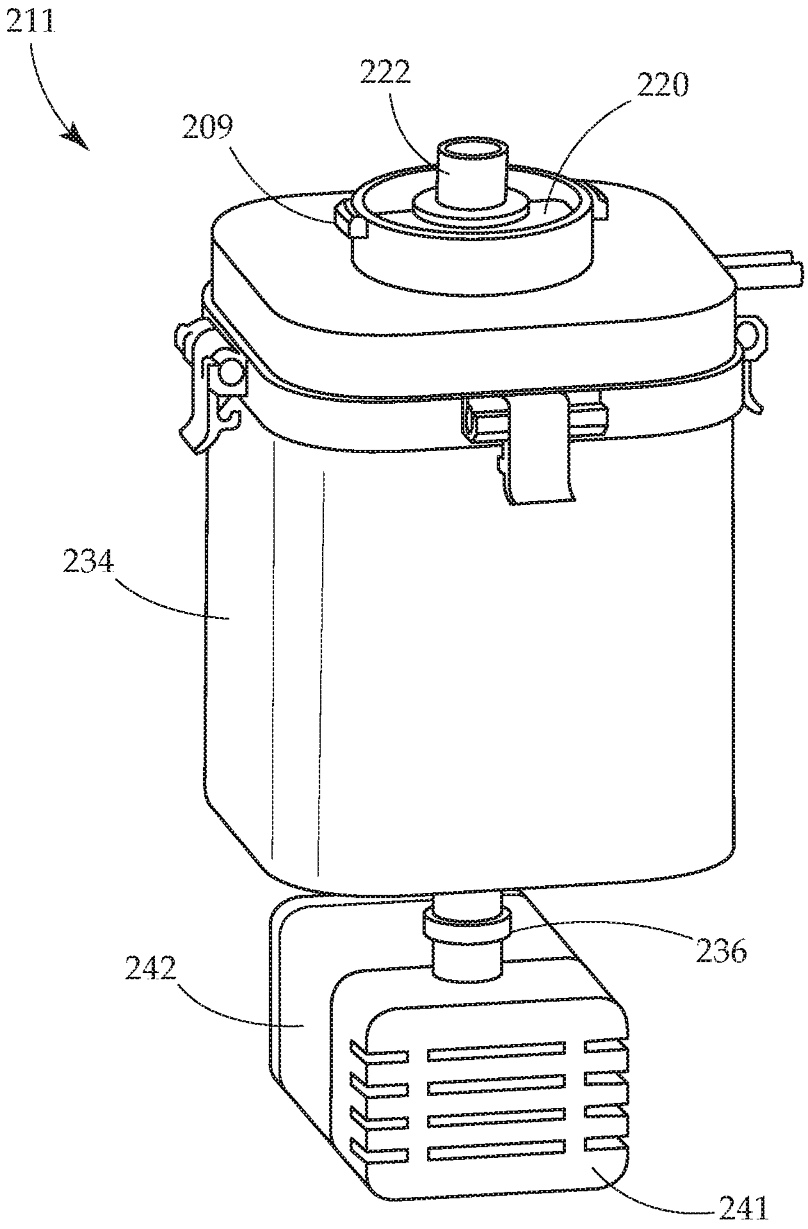

FIG. 3C illustrates an additional embodiment of the pump system assembly 211, illustrating a water pump tube 236, a battery compartment 234, a water pump 242, and a nozzle 222. Herein, one type of battery 233 is illustrated within the battery compartment 234. The battery compartment 234 is in communication with the water pump interface plate and filter 241 and the water pump additionally comprises a power cord 40. The water pump interface plate and filter 241 is in further communication with the water pump tube 236 which completes the flow to the nozzle water pump suction intake 250. In one embodiment, the water pump tube 236 is centrally located in order to travel directly through the central portion of the battery compartment. Also illustrated is the switch assembly 220 which is further explained in FIG. 6.

Figure 3D:
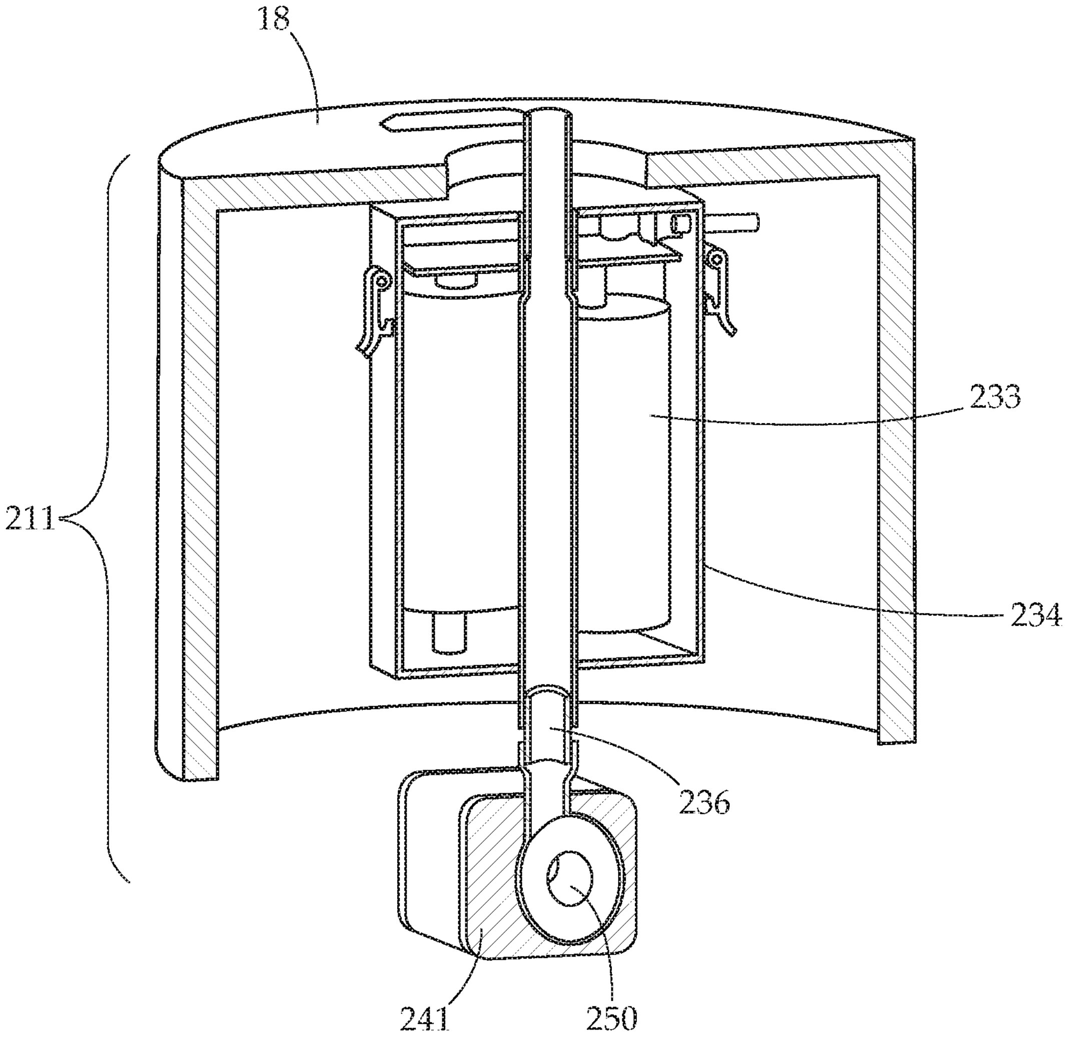

FIG. 3D illustrates a cutaway front prospective view of the overall the water pump assembly 211 which may be removable illustrating the battery compartment 234, the batteries 235 which power the Insta Fountain™ system 210, the water pump 242, the water pump tube 236.

Figure 3E:
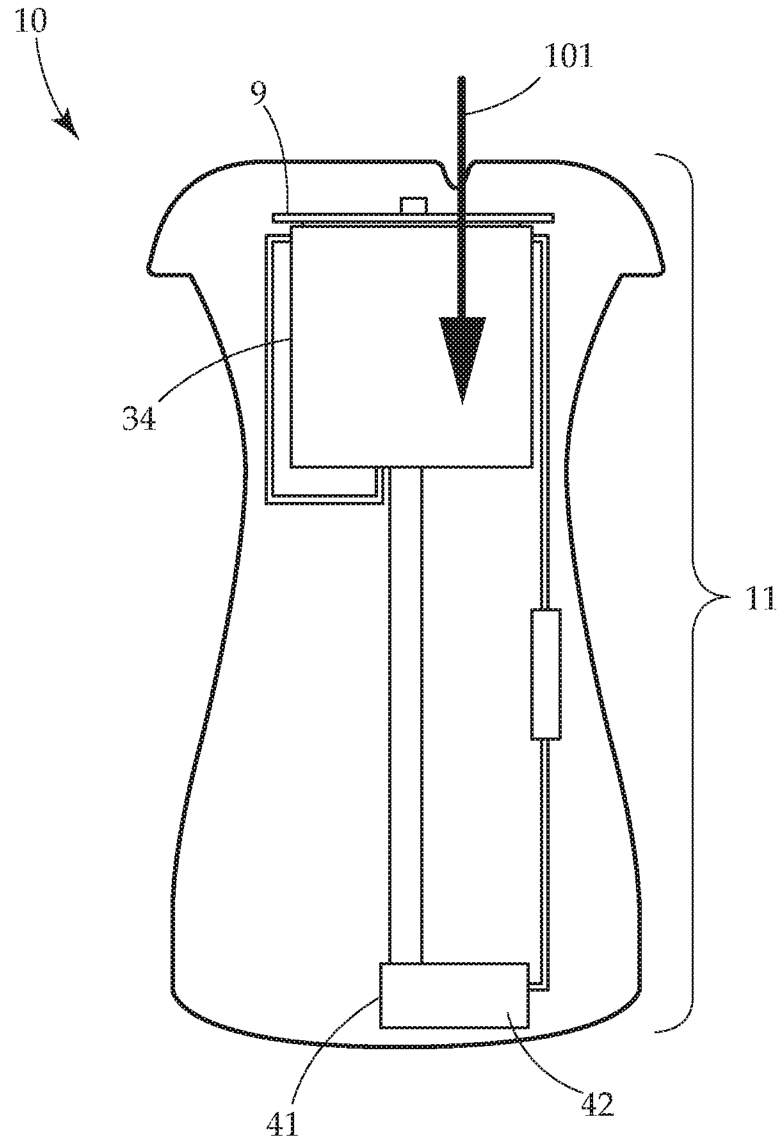
Figure 3F:
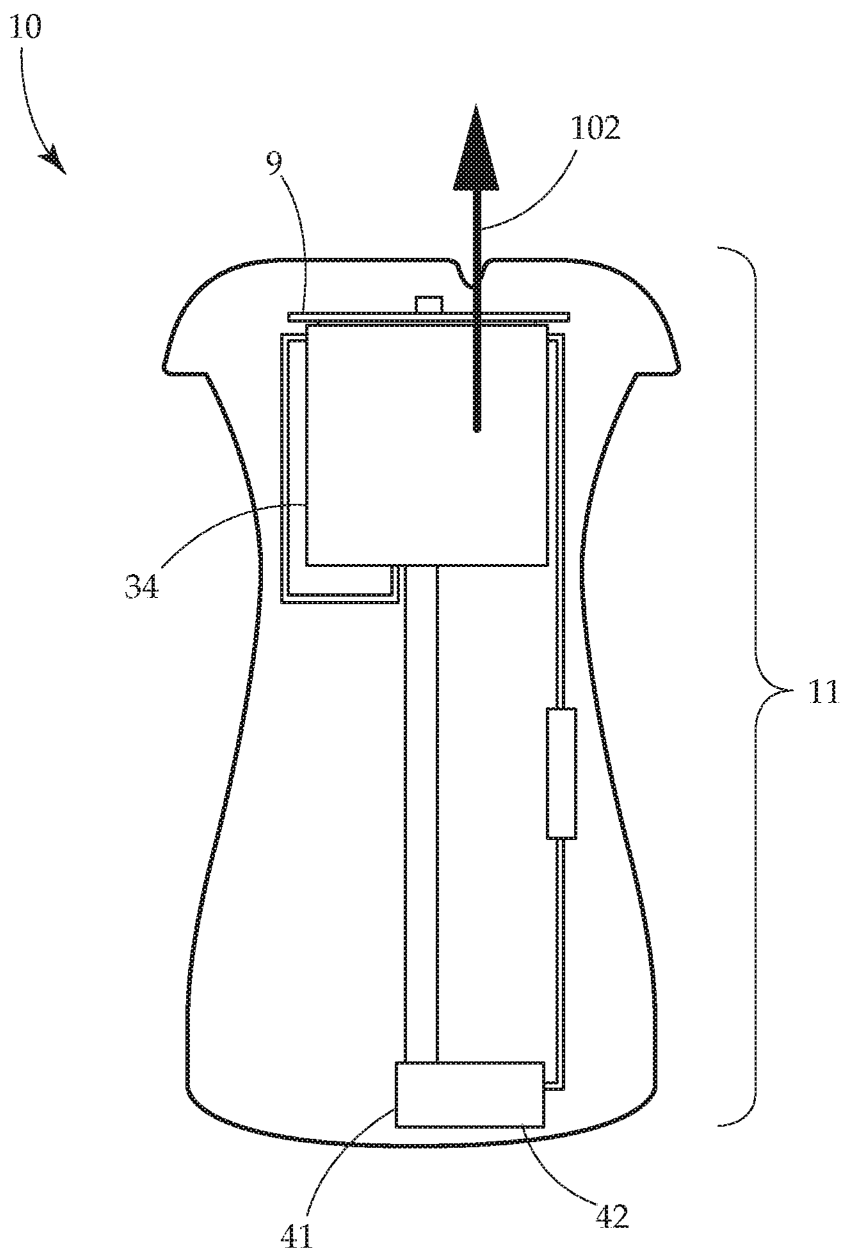

FIGS. 3E and 3F, illustrate side cross-sectional views of one embodiment of the instant system (Insta Fountain™) 10 further illustrating the water pump interface plate 41 is in further communication with the water pump 42. FIG. 3B includes a direction of installation arrow 101 for the pump and battery assembly and FIG. 3C includes a direction of removal arrow 102 for the pump and battery assembly. The battery compartment 34 is in removable communication with the nozzle 12.

Figure 3G:
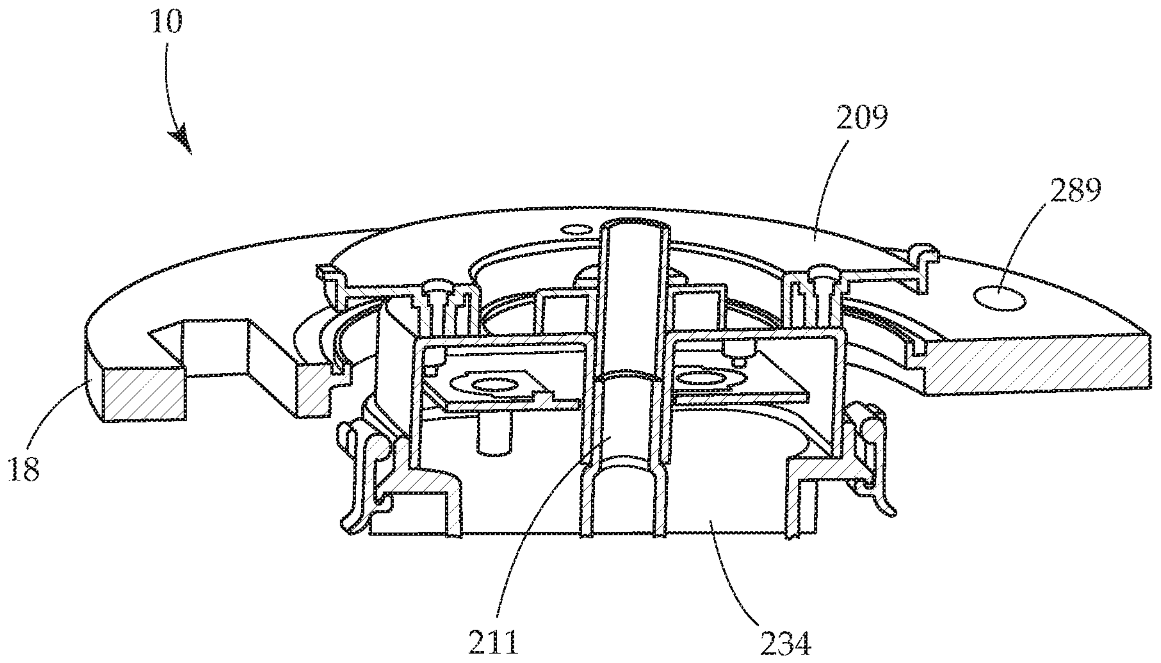

Within FIG. 3G, illustrates a cutaway front prospective view of one embodiment of the instant portable fountain system highlighting the entire water pump assembly 211 within the fountain main body structure 18. The flange 209 of the pump system 11, prior to seating on the decorative fountain main body structure 18.

Additionally, due to the inherent air pressure build up upon seating of the flange, the outer, cosmetic structure operates at a maximum when a vent hole or vent aperture 289 installed. In most embodiments, the vent aperture 289 should be located below the flange seating area, a vent hole or aperture in side or top, as there is a seal at the top due to the weight of the flange.

Figure 3I:
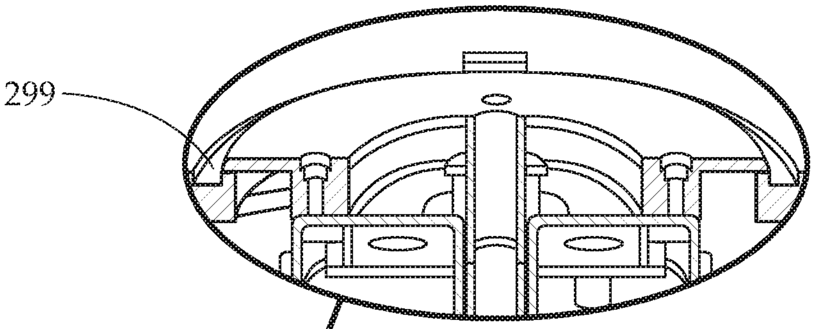
Figure 3H:
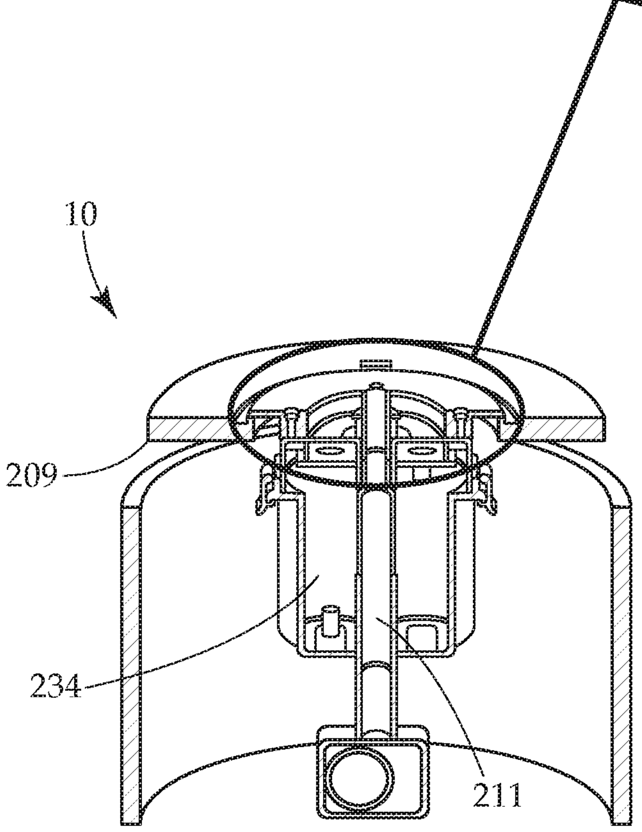

Within FIG. 3H, FIG. 3I illustrates a cutaway front prospective view of one embodiment of the instant portable fountain system highlighting, the entire the fountain main body structure 18 and the assembly flange 9 of the pump system 11, once removably seated on the seating area 299 of the decorative fountain main body structure 18.

Figure 4A:
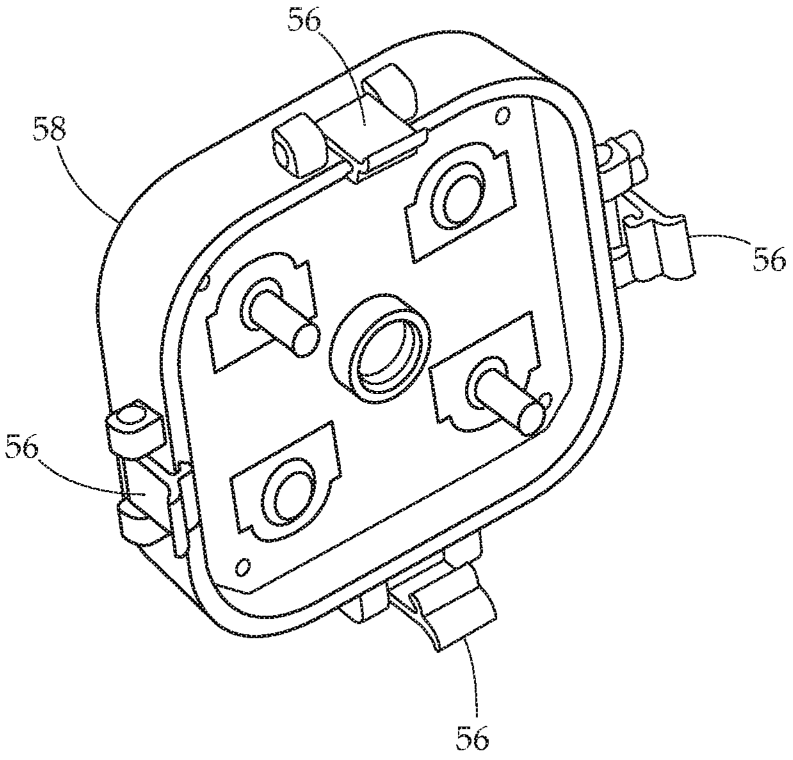
FIG. 4A-4C illustrate the removably attached battery compartment and the specific components therein for one embodiment of the instant system.
Figure 4B:
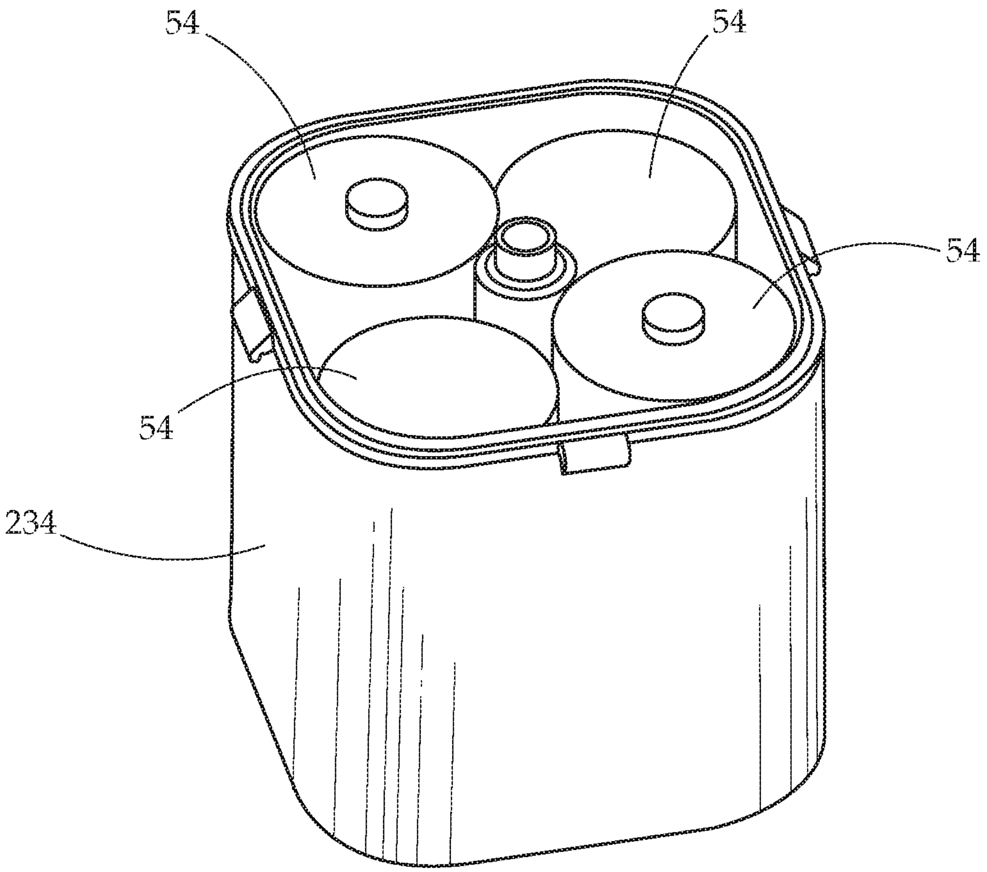
Figure 4C:
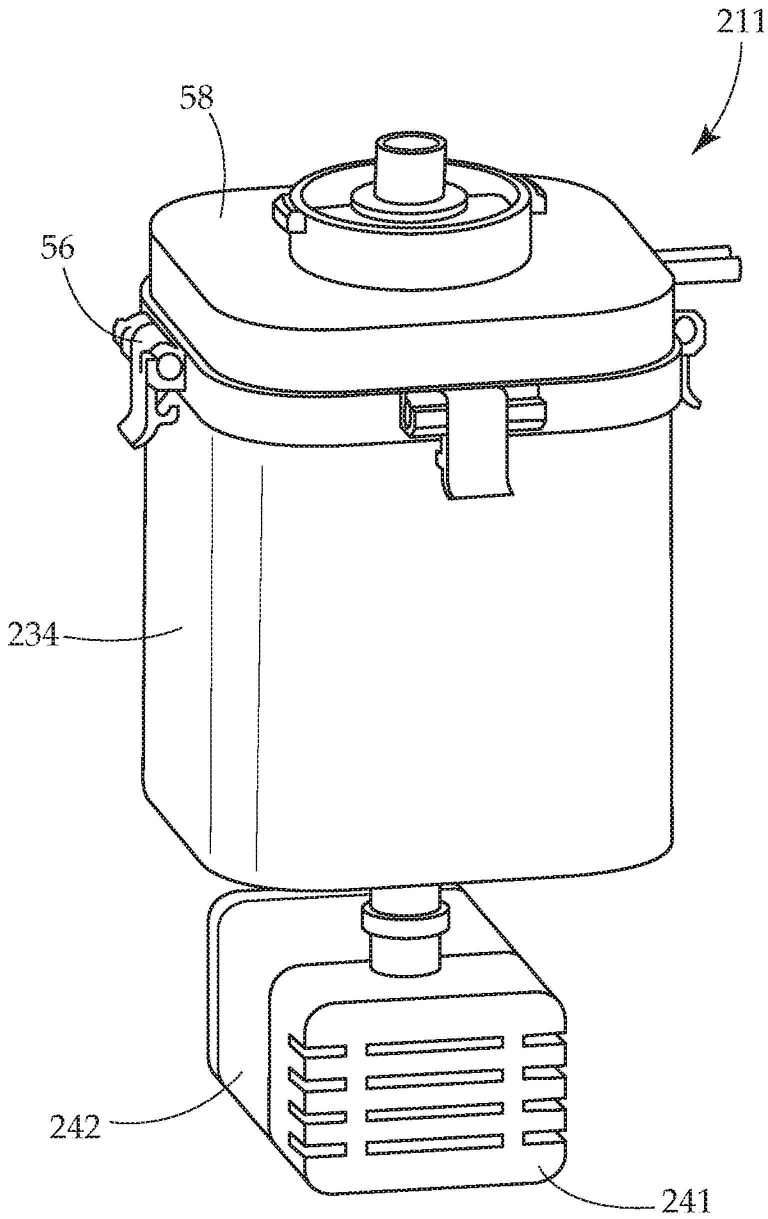

FIGS. 4A-4C, illustrate the battery compartment 34 including the components and the locations thereof. The battery compartment cover 58 utilizes clips 56 for assembly. In one embodiment, as illustrated in FIG. 4B, the clips 56 may be released and the battery compartment cover 58 removed in order to access the plurality of batteries 54. The plurality of batteries 54 are inserted into the battery compartment base 57 which is then attached to the battery compartment cover 58.

Figure 5:
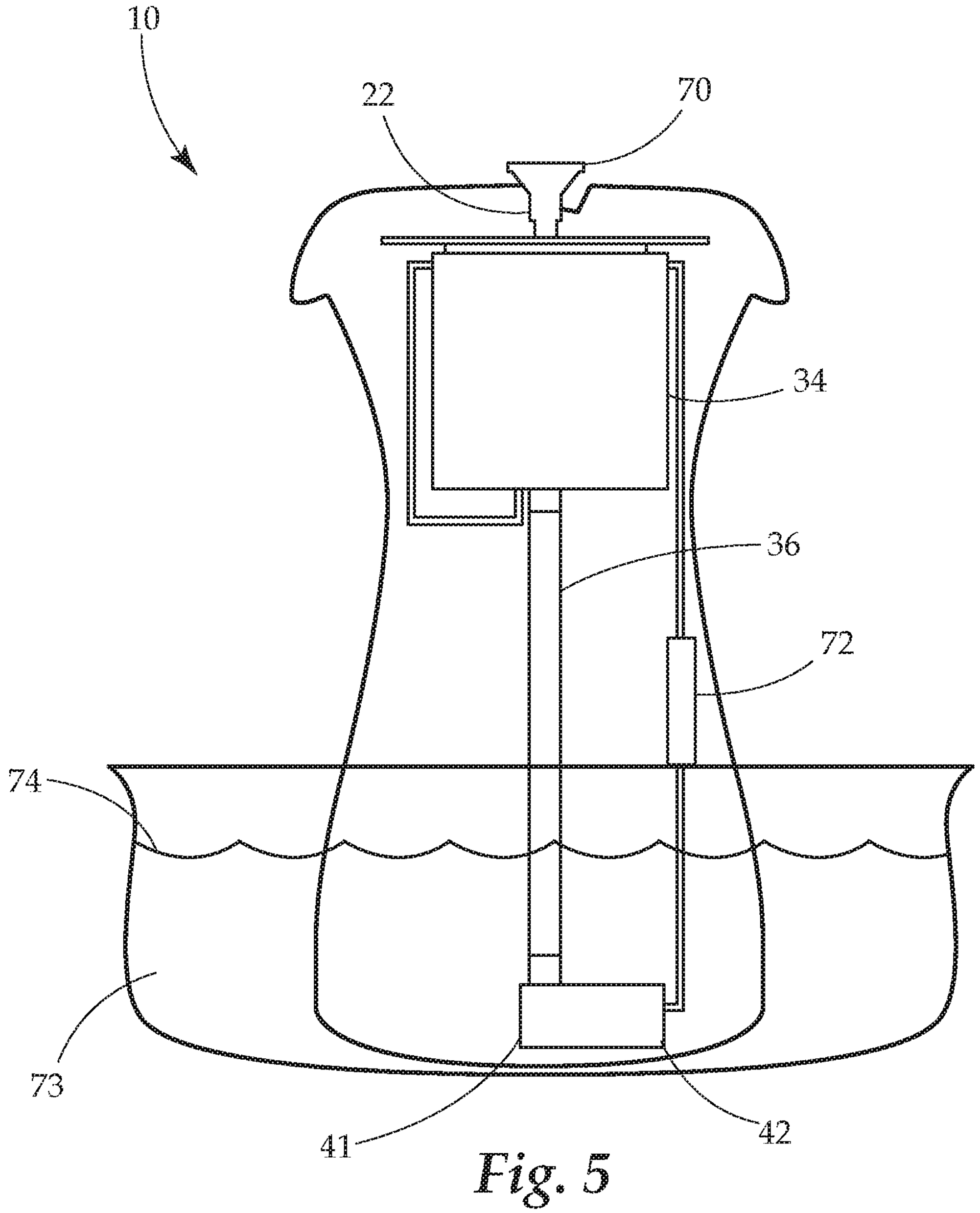
FIG. 5 illustrates a cross sectional schematic of one embodiment of the instant system (Insta Fountain™) illustrating the present apparatus used in conjunction with a water source which may be a basin and for proper operational characteristics should exhibit a minimum of 12 inches of water.

FIG. 5 illustrates a cross sectional schematic of one embodiment of the instant system (Insta Fountain™) 10. The instructions 50 illustrate that the present apparatus is to be used in conjunction with a water source 73, from which the water pump 42 may draw.

In one embodiment, the system may also include a dancing water 70 attachment in fluid communication with the nozzle assembly 22. When the fountain system is not operating, the user may connect the dancing water attachment 70 to the outlet of the nozzle assembly 22 of the Insta Fountain™.

Figure 6:
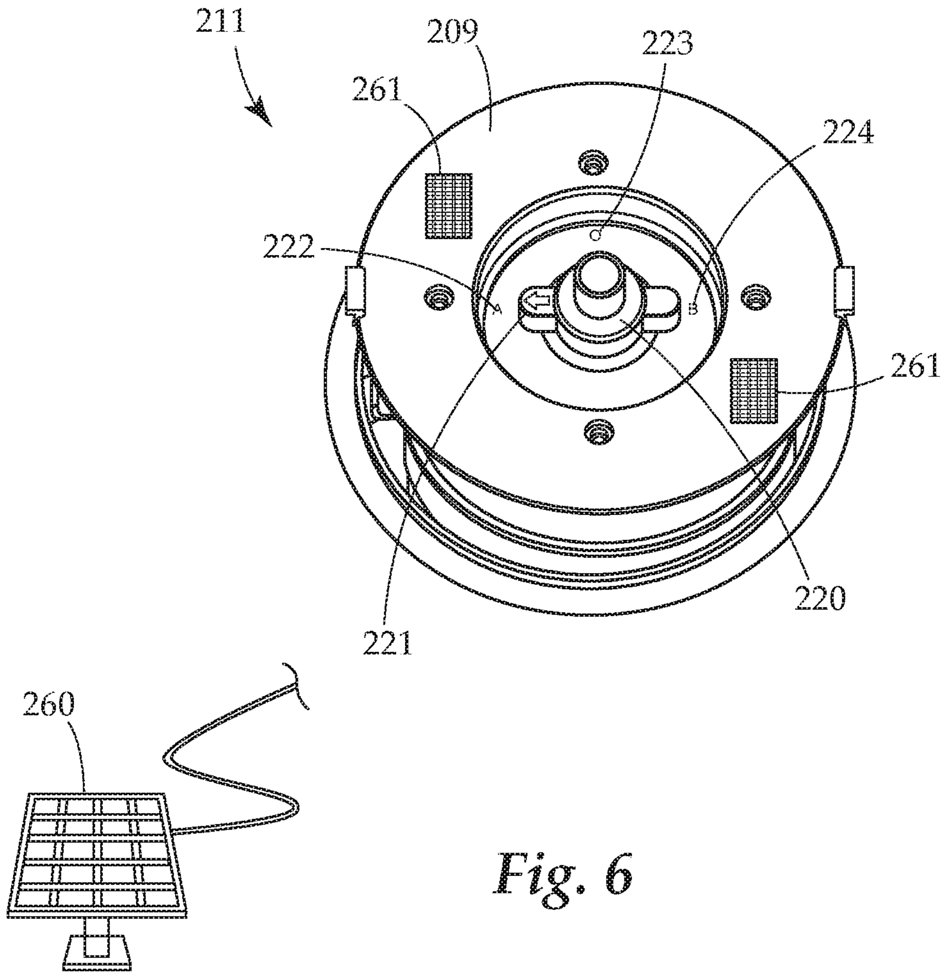
FIG. 6 illustrates the opera on system of the battery/water pump assembly and further illustrates the use of a switch system and solar apparatuses.

In one embodiment, as illustrated in FIG. 6, the operating system or components of the water pump assembly 211 may include the use of a switch assembly 220, including a rotational dial switch apparatus 221 positions may include an "A" position 222, "O" position 223, and a "B" position 224, all of which control numerous operational modes. The switch assembly 220 may be in electronic communication with a circuit board or chip assembly, as known in the art, to afford programming capabilities.

In one embodiment, the "A" position 222 will actuate the fountain for one (1) hour and then automatically deactivate the fountain. In one iteration or sequence the fountain operates for one (1) hour and then automatically shuts off. The fountain may also be programmed to restart daily at the same time and operate for one (1) hour.

For manual deactivation, the "O" position 223 turns the fountain off. Also can include a remote control and or blue tooth enabled. In another embodiment, an additional switch position, the "B" position 224, will actuate the fountain for four (4) hours with a programmed automated shut off sequence. In one iteration or sequence, the fountain will operate for four (4) hours and then deactivates. The fountain may also be programmed to restart daily at the same time and operate for four (4) hours.

Additionally, the system may include a twenty four (24) hour timer mechanism or a forty eight (48) hour timer mechanism, both, for restarting of the process. Thus the user is afforded several timed operational modes.

In a further embodiment, the system may be powered by remotely located solar panel(s) 260 connected via wireless connection or cable connection to the tower. The system may also be powered by hard mounted solar panel(s) 261 located on the outer surface of the system 211.

Thus, in addition to the switch assembly 220 and rotational dial switch apparatus 22 switch position controller described above in FIG. 6, the system may additionally afford numerous activation modes and capabilities including remote actuation, touch screen actuation, lever actuation, push button actuation, computer control water patterning and computer control of water flow.

Figure 7:
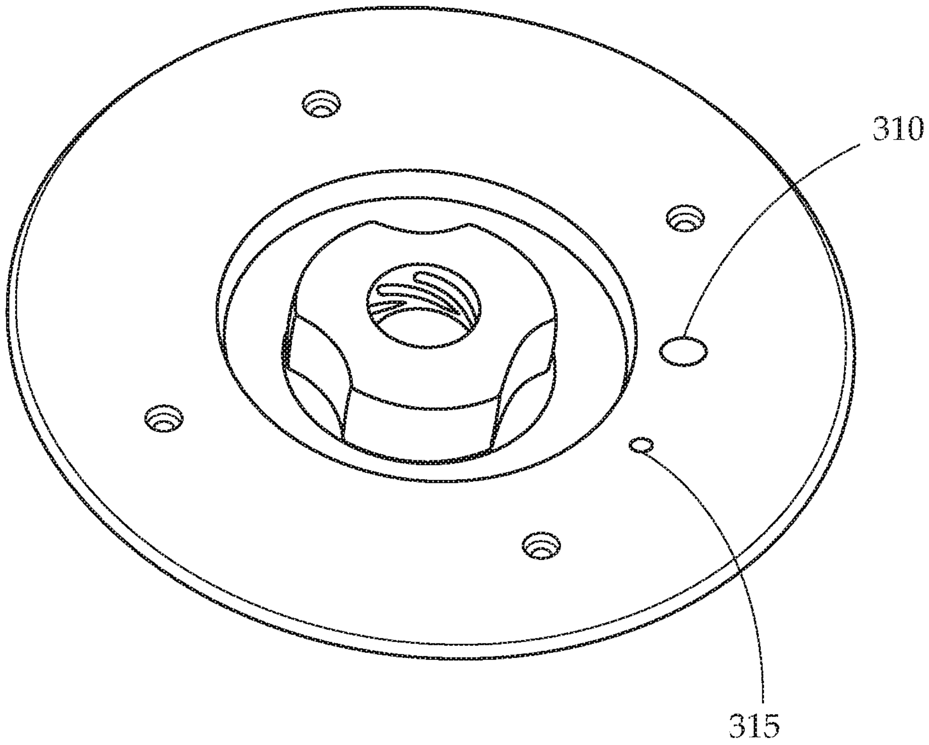
FIG. 7 illustrates the operating system or operational components of one embodiment of the instant system (Insta Fountain™) the battery/water pump assembly and further illustrates the use a push button actuation assembly including a push button and an indicator.

In one embodiment, as illustrated in FIG. 7, the operating system or operational components of the battery/water pump assembly 211 may include a push button actuation assembly including a push button 310 and an indicator, in this instance or, an indicator light 315. Depression of the push button 310 allows the user to set the system into different modes and timing sequences, much as in the use of the switch assembly and rotational dial switch position controller. The intervals for the timing of on and off cycles can be programmed in seconds, minutes, hours, days, and multiple day intervals, as set by the dial mechanism, push button, remote, touch screen or other mechanism afforded to the user.

The system may also include an indicator assembly or indicator light which illustrates to the consumer in which operational mode the system currently resides. The system may also include a light, push button and accompanying light assembly, LED light, or LCD screen. In the push button and accompanying light assembly, the push button may be utilized to program increments of seconds, minutes, hours, and days.

Figure 8:
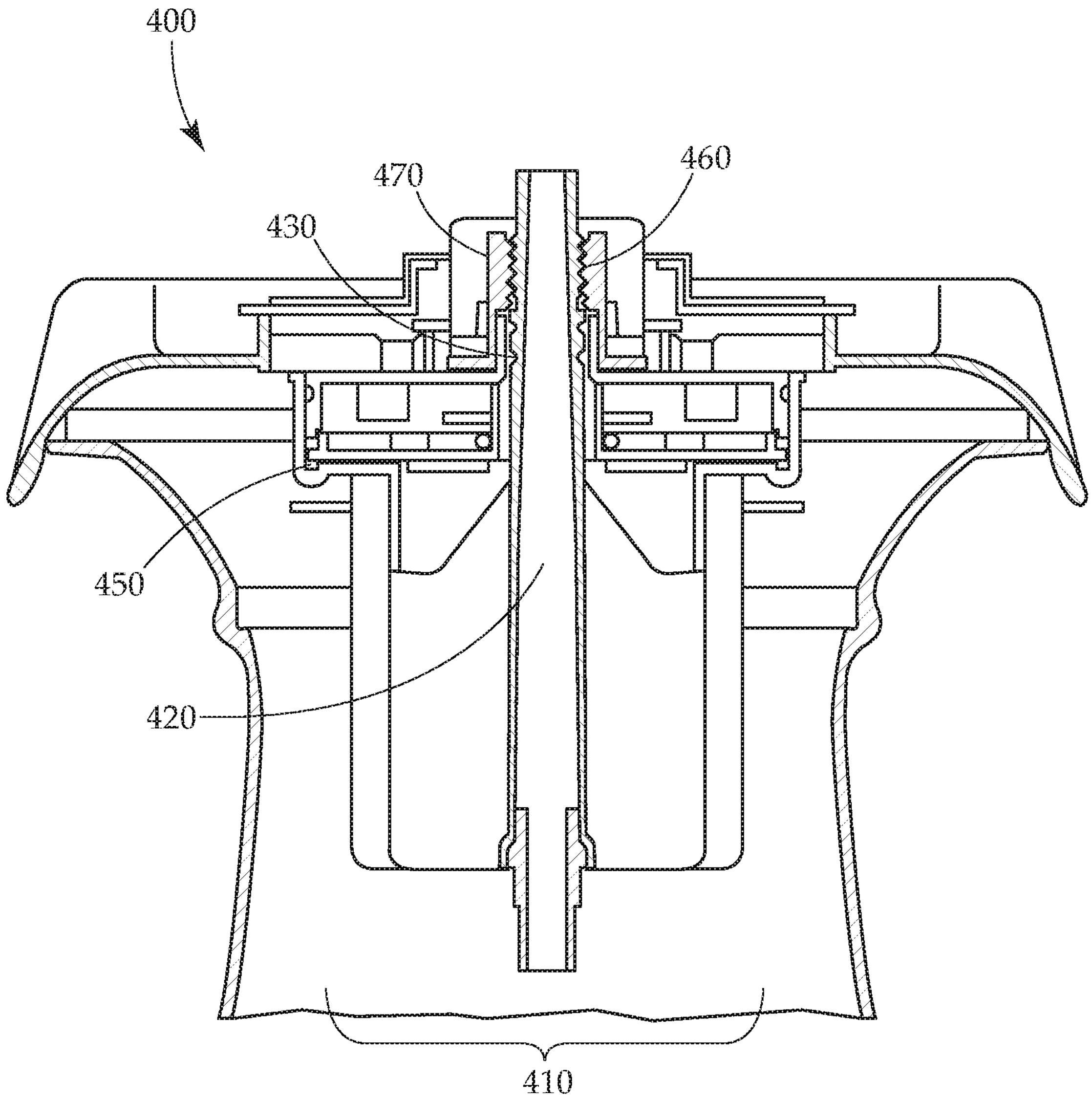
FIG. 8 illustrates a cross sectional schematic of one embodiment of the instant system (Insta Fountain™), illustrating an additional embodiment of the battery compartment and a structure wherein the threads are located above the O-rings to allow slide action. In this embodiment, the O-rings on the water tube are located above the battery compartment.

FIG. 8 illustrates a cross sectional view of an additional embodiment of the portable fountain system 400, wherein the unit is modular and set via the flange into outer housing which is a completely separate cosmetic housing. Additionally in this embodiment, the water tube is centrally disposed and sealed within battery box. Oh high import, unlike the above embodiments where in the method of closing battery box included snaps, the instant embodiment of the portable fountain system 400 employs male and female threads, internal to the battery compartment housing and external to the water tube. Thus, the male and female thread portions mate and the knob, clutch knob or nut at top, may be afforded finger grips to provide tactile feed-back when you have screwed the knob, clutch knob or nut.

Further illustrated are components of the additional embodiment of a pumping system battery compartment 410. In this embodiment, the O-rings in line the centrally mounted water tube 420, or water tube O-rings 430, are required to be located above the top portion of the battery compartment 410 due the configuration and location of the battery compartment O-rings 450. Thus, the instant configuration of O-ring sets allows for sliding action. Additionally, in this embodiment of the fountain system 400, the set of water tube threads 460 and the knob 470 physically extend above the upper surface of the cosmetic retaining device.

Figure 9:
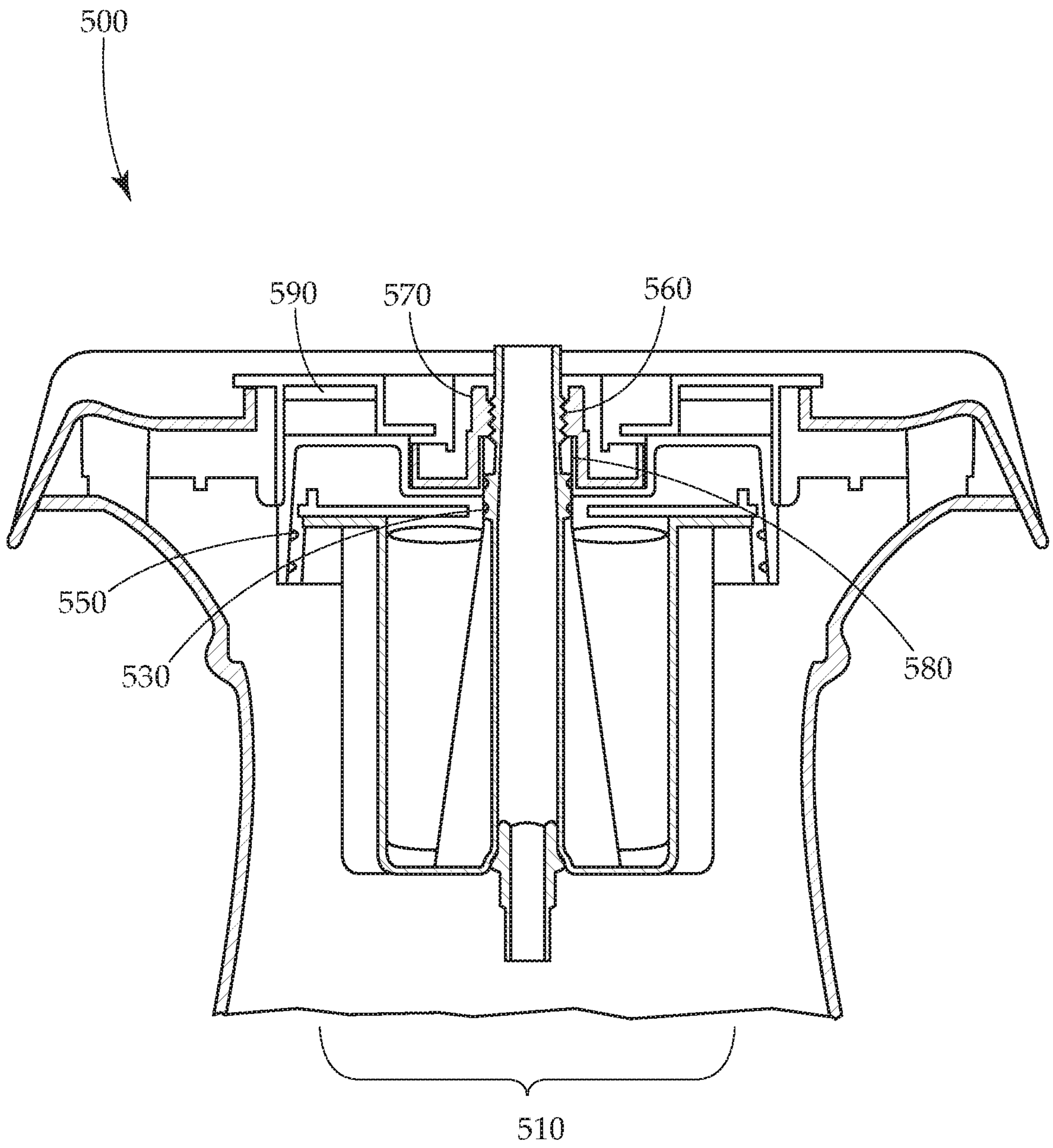
FIG. 9 illustrates a cross sectional schematic of one embodiment of the instant system (Insta Fountain™), illustrating an additional embodiment of the battery compartment with a structure change rendering the O-rings lowered to just above the upper casing of the battery compartment.

FIG. 9 illustrates a cross sectional view of an additional embodiment of the portable fountain system 500, again, as in the embodiment in illustrated FIG. 8, wherein the unit is modular and set via the flange into outer housing which is a completely separate cosmetic housing. Additionally in this embodiment, the water tube is centrally disposed and sealed within battery box. Oh high import, unlike the above embodiments where in the method of closing battery box included snaps, the instant embodiment of the portable fountain system 500 employs male and female threads, internal to the battery compartment housing and external to the water tube. Thus, the male and female thread portions mate and the knob, clutch knob or nut at top, may be afforded finger grips to provide tactile feed-back when you have screwed the knob, clutch knob or nut.

Further illustrating components of the additional embodiment of a pumping system battery compartment 510. In this embodiment, the O-rings in line the centrally mounted water tube 520, or water tube O-rings 530, are not required to be located above the top portion of the battery compartment 510 due to a designed in structure change. This refit renders the battery compartment O-rings 550 free to be lowered to be in line with the upper portion of the casing of the battery compartment 510.

Thus, because the manner in which the battery compartment O-rings 550 are installed for this embodiment of the fountain system 500, the set of water tube threads 560 and the knob 570 are now physically flush with the upper surface of the cosmetic retaining device.

Further akin to this additional embodiment, a recess on the knob 570 now creates a space to allow three finger operation to maneuver the knob 570. In one embodiment, the space may have parameters of 14 mm×13.5 mm. Additionally, the water tube screw assembly may be configured with a quick thread so that the water tube screw threads 560 is now designed to reside on the same level with the round disk 580. Thus, with this refit assembly, the system seats itself and there is no requirement that the user apply a downward force on the system in order to properly seat the flange and thus creating a seamless water drop effect. Additionally illustrated in FIG. 9 is the area for positioning of the push button actuator 310 and indicator light 315.

Figure 10:
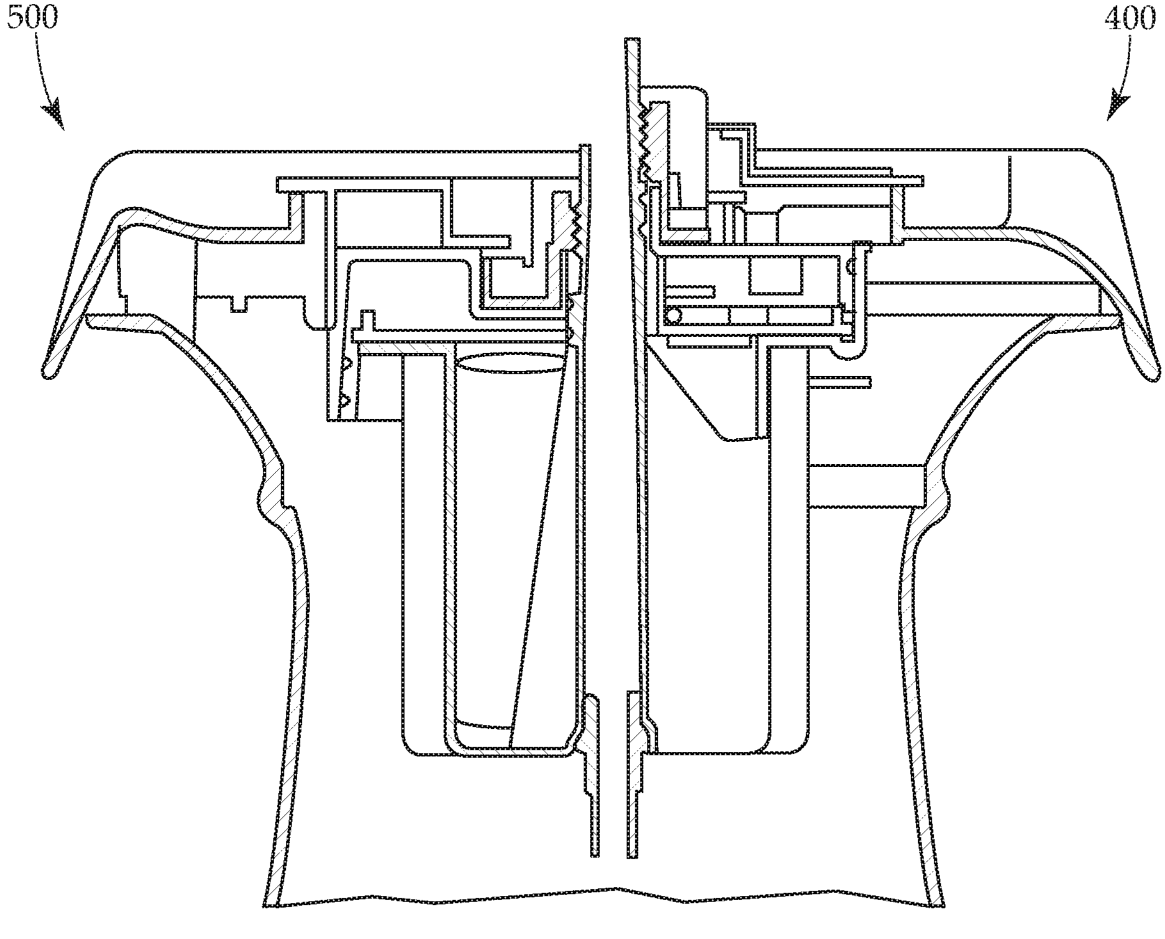
FIG. 10 illustrates a comparison of the two embodiments of the portable fountain system illustrated in FIG. 8 and FIG. 9.

FIG. 10 illustrates a comparison of the two embodiments of the portable fountain system illustrated in FIG. 8 and FIG. 9.

Thus, inherent in the design, by utilizing the flanged system for removably attached installation and removal, the user can drop the pumping system into any cosmetic structure. Further, the flange design affords the user the ability to change materials as there is no screwing or affixing.

Thus, in addition to the switch assembly 220 and rotational dial switch apparatus 22 switch position controller described above in FIG. 6, the system may additionally afford numerous activation modes and capabilities including remote actuation, touch screen actuation, lever actuation, push button actuation.

The prime fluid mover or pumping system may include any kind of fluid pumping mechanism, or fluid actuator device which may meet installation requirements, including but not limited to positive displacement pumps including but not limited to: rotary lobe pumps, progressive cavity pumps, rotary gear pumps, rotary regenerative (peripheral) pumps, piston pumps, diaphragm pumps, rotary screw pumps, screw pumps, gear pumps, hydraulic pumps, rotary vane pumps, peristaltic pumps, rope pumps, flexible impeller pumps, plunger pumps, roots type pumps, Triplex-style plunger pumps, Compressed-air-powered double-diaphragm pumps, metering pumps, centrifugal pumps, AODD pumps, impulse pumps including hydraulic ram, pulser pumps and airlift pumps. Additionally, linear-type positive displacement pumps such as chain and rope type pumps may be utilized.

In numerous embodiments, the pumping system may be powered by numerous means including electric corded, electric rechargeable, solar, battery, disposable battery, rechargeable battery.

The upper portion of the instant system is disposed to provide a water drop fountain capability. The water may flow directly out and down the side without allowing pooling and the system may utilize diverting mechanisms. In some embodiment, the system may utilize various configurations of water containment vessel. In additional embodiments, the system may not utilize a basin and may simply divert the water which flows from the nozzles.

The system may utilize water diverting systems such as slate wall systems, conical type systems, inverted conical type systems, parabolic type systems, inverted parabolic type systems; triangular systems, inverted triangular systems, wave form systems and the like. Further, the release of fluid may be straight or conditioned and thus may free flow, spurt, squirt, pool and flow, or any combination of the above.

Thus, in some embodiments, the system may also act like a conical water drop. In an additional embodiment, the system may utilize an upper area water containment vessel or collection basin which works in conjunction with a drainage port, or any number of drainage ports ranging from 2-50 ports, or as many ports as may be fitted into the upper portion. This configuration would thus allow water to pour over an edge.

When using an entirely integrated battery/water pump assembly wherein the system would be molded into one body. The pump, switch, batteries, and or solar panel and the outer decorative casing could all be in one unit for a lower cost. Installation of the entirely integrated battery/water pump assembly becomes nothing mare than lowering the system in place as the system utilizes a unique modular design.

In an additional embodiment, the system can be scaled down to be the size and shape of the soda can wherein the batteries and pump can be contained within the system. Additionally, the upper portion, or top of the soda can, may be the outlet for the water. Furthermore, the outside of the soda can may be designed to have a decorative shape and the fluid may pour over the top of the soda can, thus creating a fountain.

Regarding installation and changing of the power source batteries, first, ensure that the fountain is not in operational mode and lift out the battery and pump assembly. Next, the user should set the pump assembly on a flat, sturdy surface and unclip the four (4) battery retaining clips. Subsequently, insert 2 batteries with the (+) side facing up and 2 batteries with the (−) facing down. Re-clip the four (4) battery retaining clips. Finally, reinsert the battery and pump assembly into the Insta Fountain™. When installing or reinstalling the battery and pump assembly into the Insta Fountain™, ensure that top plate of the battery & pump assembly sits flat on top of Insta Fountain™ to prevent water from leaking into assembly reducing fountain performance.

One or more of the battery retaining clips may pop loose from the battery compartment. They are designed to pop loose if excessive pressure is applied. Simply press the battery retaining clips back into the battery compartment. The system should not be operated unless all battery clips (four (4) in some embodiments) are properly secure to make the compartment air tight as if not, water could seep into the Battery Compartment.

Further, if the Insta Fountain™ water pump is running, but water is not flowing from the fountain, the water pump should be primed. To prime the pump, rest the Insta Fountains™ assembly on its side and detach the water pump from the feeder tube inside the Insta Fountain™ assembly.

When removing the water pump, the operator should use caution when pulling the pump from the feeder tube. For removal inch the bottom of the feeder tube close to the pump with one hand and then pull the water pump from the feeder tube with the other hand. First, submerge the water pump into the water inside the bowl and lightly shake the pump to release air bubbles inside the pumps vents. Then, turn the fountain on, water should flow from the pump outlet. Run pump for about 10 seconds and then turn the fountain off. Finally, reconnect the water pump to the feeder tube inside the Insta Fountain™, place the Insta Fountain™ into the bowl and turn the fountain on.

Additionally, if the water pump becomes disconnected from the water tube inside of the fountain bowl or if the water tube gets disconnected from the battery compartment, to reconnect the water pump, first, rest the fountain bowl on its side in the large bowl. Second, connect the outlet on the water pump to the tube inside of the Insta Fountain™ assembly, ensuring that the connection is snug.

In regard to troubleshooting the system, if the Insta Fountain™ does not actuate open powering up the system and the batteries are known to be good, the water pump power connection may have become loose or disconnected. Follow these steps to check the connection of the water pump power cord 72 connection. First, lift out battery and pump assembly from the Fountain Tower and set battery and pump assembly on a flat sturdy surface. Then, inspect the Water Pumps electrical connector and ensure that the two ends of the connection are seated snuggly together. Finally, set the battery and pump assembly back into the Insta Fountain™ and actuate the fountain to ensure that the water pump is running correctly.

In order to maintain the fountain in proper working order and free of algae, the fountain should be cleaned every two months by utilizing a mild soap and a soft cloth, subsequent to draining all of the water and disassemble the Insta Fountain™ system. The fountain bowl will form a natural patina finish which with time may appear lighter or whiter than the original color. This is normal. Do not scrub the fountain, as this could cause damage to the finish of the Bernini Fountain.

Regarding maintenance and storage of the Insta Fountain™ system, drain the water from fountain prior to the first freeze of the season. Clean and dry the fountain of all water. Remove the batteries and the water pump and bring it indoors. Store in a warm dry area.

Regarding maintenance of the water pump, and accompanying filter apparatus and impeller apparatus, cleaning of the water pump inner portions should occur periodically. At very least after six weeks of usage, the water pump filter and impeller to should be cleaned. In order to accomplish cleaning of the filter, first remove the water pump cover by grabbing the sides and pulling the water pump cover up and off the unit. Second, remove the air filter from in front of the water pump. Third, rinse the air filter until all debris has been removed and finally replace the air filter to the front of the water pump and in turn replace the water pump cover.

In order to accomplish cleaning of the water pump impeller, first remove the front panel of the water pump by grabbing the sides of the front panel and pull the cover off of the unit. Second remove the tightly fitted impeller chamber cover and the impeller from the impeller chamber. Third, rinse the impeller until all debris has been removed and replace the impeller in the impeller chamber. Finally, restore the impeller chamber cover and the pump front panel to the normal positon for future usage.

What is claimed:

1. A portable fluid dispersion system comprising:
a main body structure comprising:
an upper portion; and
a seating area located in the upper portion;
a pump system assembly, wherein the pump system assembly comprises:
a fluid actuator device;
a water pump tube;
a water pump power cord;
a water pump suction intake;
a switch system;
a battery compartment, wherein the battery compartment is located above a water body;
a power source;
a control mechanism;
wherein the battery compartment, the pump system and the control mechanism comprise a single modular unit, and the single modular unit further comprises a flange at a top portion of the single modular unit, and the flange rests on the seating area of the main body structure creating a seal to suspend the single modular unit in the main body structure.

2. The portable fluid dispersion system of claim 1 wherein the pump system assembly is a removably attached, modular system internally disposed within the main body structure.

3. The portable fluid dispersion system of claim 1 wherein the main body structure comprises a centralized hollow cylinder.

4. The portable fluid dispersion system of claim 1 further comprising a knob comprising a set of male threads and a set of female threads internal to the battery compartment and disposed on the water tube and to provide a tactile finger grip for installation of the battery compartment.

5. The portable fluid dispersion system of claim 1 wherein the pump system assembly is internally disposed pump system located within the centralized hollow cylinder of the main body structure.

6. The portable fluid dispersion system of claim 1 further comprising a dancing water attachment in fluid communication with the nozzle assembly.

7. The portable fluid dispersion system of claim 1 further comprising at least one timer mechanism from the group consisting of a twenty four hour timer and a forty eight hour timer, wherein the switch system is in electrical communication with to automatically actuates and shuts down the pump system.

8. The portable fluid dispersion system of claim 1 further comprising a switch system in electrical communication with the pump system assembly and the timer mechanism, the switch system comprising a set of switch positions A, O, and B, wherein the set of switch positions A, O, and B is disposed to actuate a set of pump system operational modes.

9. The portable fluid dispersion system of claim 7 further comprising a push button and an indicator light disposed to actuate a set of pump system operational modes.

10. The portable fluid dispersion system of claim 7 wherein the timer mechanism is disposed to actuate the portable fluid dispersion system in intervals selected from the group consisting of, seconds, minutes, hours, days, and multiple day intervals.

11. The portable fluid dispersion system of claim 7 wherein the flange seats automatically with no screwing or affixing and thus affords a user the ability to change main body structure materials.

12. A portable fountain system comprising:
a body structure comprising a water diverting system;
a pump system comprising:
a fluid actuator;
a water pump tube; and
a water pump power cord;
a flange located on a top portion of the pump system;
a battery compartment, wherein the battery compartment is located above a water body; and,
a set of fluid drainage ports disposed to provide drainage from a water containment vessel and recirculation to the water pump system;
a nozzle; and,
a timer mechanism;

wherein the battery compartment and the pump system comprise a singular modular unit that further comprises a flange at a top portion of the singular modular unit that and the flange rests on a seating area in the body structure suspending the singular modular unit inside the body structure; and wherein the portable fountain system overcomes buoyant forces and remains in a fixed location on a flat bottom surface in a water containment system.

13. The portable fountain system of claim 12 wherein the timer mechanism is disposed to actuate the portable fluid dispersion system in intervals selected from the group consisting of, seconds, minutes, hours, days, and multiple day intervals.

14. The portable fountain system of claim 12 further comprising a computer control water patterning and water flow.

15. The portable fountain system of claim 12 wherein the pump system is selected from the group consisting of: rotary lobe pumps, progressive cavity pumps, rotary gear pumps, rotary regenerative (peripheral) pumps, piston pumps, diaphragm pumps, rotary screw pumps, screw pumps, gear pumps, hydraulic pumps, rotary vane pumps, peristaltic pumps, rope pumps, flexible impeller pumps, plunger pumps, roots type pumps, Triplex-style plunger pumps, Compressed-air-powered double-diaphragm pumps, metering pumps, centrifugal pumps, AODD pumps, impulse pumps including hydraulic ram, pulser pumps and airlift pumps, chain pumps and rope type pumps.

16. A portable fountain system comprising:

a body structure comprising a water diverting system;

a pump system comprising:

a fluid actuator;

a water pump tube; and a water pump power cord;

a flange located at a top portion of the pump system;

a battery compartment;

a set of fluid drainage ports disposed to provide drainage from a water containment vessel and recirculation to the water pump system;

a nozzle; and, wherein the battery compartment and the pump system comprise a singular modular unit that further comprises a flange located at a top portion of the singular modular unit and the flange rests on a seating area in the body structure suspending the singular modular unit inside the body structure; and wherein the portable fountain system overcomes buoyant forces and remains in a fixed location on a flat bottom surface in a water containment system.

17. A modular fountain system, the system comprising:

a support structure comprising an elongated hollow body having an open upper portion, an open lower portion, and an inner diameter, the open lower portion configured to be disposed within a water container, the open upper portion having a seating flange extending radially inward, the seating flange defining an opening having a support diameter smaller than the inner diameter;

a modular pump assembly comprising:

a housing configured for enclosing one or more power source in electrical contact with conductive connectors, the housing having a watertight seal, a housing length, and a housing width, wherein the housing width is smaller than the support diameter;

a housing flange extending radially from the housing, the housing flange having a flange diameter smaller than the inner diameter of the support structure and larger than the support diameter;

an elongated tube extending through the housing, the tube having an upper end, a lower end extending from a bottom of the housing, and a tube length;

a pump disposed at the lower end of the tube, the pump connected to the conductive connectors in electrical communication with the one or more power source, the pump configured to pump water from the lower end of the tube to the upper end of the tube;

a water outlet disposed at the upper end of the tube for releasing water at the upper portion of the support structure;

wherein the housing flange is configured to support the housing within the support structure above a water level within the water container and the tube length is configured to position the pump near the lower portion of the support structure below the water level within the water container; and wherein the modular pump assembly is configured as a unit dimensioned to fit within the support structure by insertion of the assembly through the open upper portion of the support structure, wherein the housing flange is configured to support the assembly on the seating flange without fastening.

18. The modular fountain system of claim 17, wherein the water outlet comprises a nozzle disposed at the upper end of the tube.

19. The modular fountain system of claim 17, wherein the open upper portion of the support has an annular containment vessel disposed therein configured for accumulating water released from the water outlet.

20. The modular fountain system of claim 19, wherein the annular containment vessel has a plurality of drainage ports formed therein for releasing water.

21. The modular fountain system of claim 17, wherein the one or more power source is a plurality of batteries.

22. The modular fountain system of claim 17, wherein the one or more power source is rechargeable batteries and further comprising a connection to an external power source.

23. The modular fountain system of claim 17, wherein the external power source is a solar panel.

24. The modular fountain system of claim 17, further comprising at least one control switch disposed within the housing configured to activate the pump.

25. The modular fountain system of claim 24, wherein the at least one control switch is configured for remote activation in response to a remote controller.

26. The modular fountain system of claim 17, further comprising one or more indicator light disposed on an upper surface of the housing.

* * * * *